Dec. 10, 1968 R. EMEIS ET AL 3,414,964
METHOD FOR THE PRODUCTION OF A SOLDERED JOINT
Filed Jan. 22, 1965
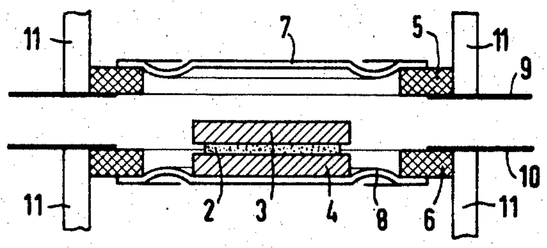

United States Patent Office 3,414,964
Patented Dec. 10, 1968

3,414,964
METHOD FOR THE PRODUCTION OF A SOLDERED JOINT

Reimer Emeis, Ebermannstadt, Upper Franconia, Joachim Haus and Adolf Herlet, Pretzfeld, Upper Franconia, Hans Nagorsen, Streitberg, Upper Franconia, and Heinz Martin, Munich, Germany, assignors to Siemens Aktiengesellschaft, a corporation of Germany
Filed Jan. 22, 1965, Ser. No. 428,287
Claims priority, application Germany, Jan. 24, 1964, S 89,205
2 Claims. (Cl. 29—473.1)

ABSTRACT OF THE DISCLOSURE

The invention describes a process for producing a hard soldered joint between metals of Group I*b* of the Periodic System of Elements and a ceramic ring. According to the invention, a metal sheet is less than 0.5 mm. thick and the ceramic ring is at least ten times thicker in the area parallel to the sheet to be soldered. Illustratory of the solders is a silver-copper eutectic.

Soldered joints between metal sheets and ceramic parts are already known. Such soldered joints can be devided into two groups. In one group the difficulties arising from the differences between the coefficient of thermal expansion of metals and ceramic, are surmounted by fitting the metal parts accordingly. Special metal alloys are being used for these purposes. Such metal alloys consisting of iron, nickel and cobalt have become known under the trade names Fernico, Kovar and Vacon. Kovar, for example, is a low expansion iron based alloy with 28 to 30% Ni; 15 to 18% Co and fractional percentages of manganese. In another group, soldered joints of virtually any solderable metal can be used. The tensions between metal and ceramic are bridged in this case through a soft soldered joint. However, a hard soldered joint between metals of the Group I*b* of the Periodic System of Elements, i.e. the metals copper, silver and gold, and ceramic parts was not known.

Our invention has as an object a method for overcoming the previous difficulties.

Our invention relates to a method of producing a soldered joint between a metal sheet of the Group I*b* of the Periodic System of the elements as defined above and a ceramic part, particularly of aluminum oxide. According to our invention the metal sheet is less than 0.5 mm. thick, and the ceramic part has such measurements that it is at least ten times thicker in the area parallel to the sheet to be soldered, than the metal sheet, and that a hard solder is being used. Preferably, a solder consisting of the silver-copper-eutectic is used and advantageously after the melting of the solder, the solder joint is very slowly cooled, to produce a balance between any tensile stresses possibly occurring. Tests have shown that hard solder joints thus produced between silver foils and ceramic are very stable as well as moisture proof and gas tight.

The invention will be further described by means of a specific example, which discloses additional details and advantages of the process.

The drawing shows an encased semiconductor device in whose production the method of the invention may be applied. All parts illustrated in the drawing may be assumed to be circular to simplify matters.

The actual semiconductor element consists of a semiconductor body 2, having electrodes for the input and output of current and two molybdenum discs 3 and 4 which may be, for example, 20 mm. in diameter and 3 mm. thick and which serve to protect the semiconductor body 2 against mechanical stress. The component consisting of parts 2, 3 and 4 may be produced according to known diffusion and/or alloying techniques. This component should be enclosed within a gas- and moisture-tight casing. This casing consists of two ceramic rings 5 and 6 having a hollow body with a central opening, which may, for example, consist of sintered aluminum oxide (sinter-corundum) and two metal foils 7 and 8, which are attached to the ceramic parts 5 and 6. Foils 7 and 8 have a curved in portion which, after assembly, prevents the component comprising parts 2, 3 and 4 from sliding to the side. Additional metal rings 9 and 10 are attached to the ceramic rings 5 and 6 which, for example, may be hard soldered and may consist of an appropriate iron-nickel-cobalt alloy such as Kovar. The casing can be closed with the aid of these rings 9 and 10 by joining the outer rims of parts 9 and 10 by means of welding, hard soldering or flanging. During this process, parts 9 and 10 and their inner rims, which are attached to rings 5 and 6, lie very firmly on top of each other. The component, within the casing, is not endangered by the process steps performed at the outer rim during the closing of the casing.

Several semiconductor devices enclosed in such housings may then be piled up and thus be electrically switched in series, whereby a plunger pressing upon the pile assures an efficient contact of the individual contact surfaces. U.S. application Ser. No. 214,076, now Patent No. 3,280,389 issued Oct. 18, 1966, described such a semiconductor device.

In the production of this type of casing, as previously stated, the ring 9 is first of all mounted to the ceramic ring 5. Before, after or preferably simultaneously, foil 7 is affixed at the ceramic part 5 by soldering according to the method of the invention wherein the opening and front face of the ceramic part is covered by said foil. Foil 7 may, for example, consist of silver, which shows the purity required for semi-conductor properties and which is very suitable for use as electric contact material. According to the invention, the thickness for this foil is less than 500$\mu$ and is usually between 10 and 300$\mu$. In the present example, foils 7 and 8 are about 200$\mu$ thick. Accordingly, the thickness of rings 5 and 6 is larger than 2 mm. and is in the instant example 3 mm. With this dimensioning, the stress between silver and aluminum oxide can still be balanced.

When the silver foil is soldered to the ceramic part, the aluminum foil is not torn nor is the ceramic ring broken. Furthermore, there is no tearing of the solder joint.

For soldering the foil to the ceramic part, we use a solder which is related to the foil material. Thus, for example, with a silver foil a silver-copper-eutectic is used as the solder. This solder consists of silver with a copper portion of about 28.5% by weight. The melting temperature is 780° C. The soldering temperature is preferably above 800°, and in the example is about 815° C.

The solder can be applied to the solder joint in pulverized form or in the form of a ring stamped from a foil of the solder about 50$\mu$ thick. The parts to be joined together are advantageously put into a furnace and heated to the soldering temperature of, for example, 820° C. The furnace, thereafter, is slowly cooled, which produces an additional annealing of the silver foil to equalize celtain tensile stress. Advantageously, the parts are cooled with a temperature gradient of less than 10° per minute. The temperature decline may average about 5° per minute. Since cooling takes place according to an *e*-function, only an average temperature gradient can be given. Hard soldered joints thus produced between ceramic and metal sheets of silver-copper and gold are very durable and are gas and moisture tight. This latter characteristic is very important in semiconductor techniques. Copper sheets can be soldered with the same alloy and gold sheets can readily be soldered with a gold-copper eutectic alloy.

After foils 7 and 8 and rings 9 and 10 have been attached to the ceramic parts 5 and 6, the two housing half portions comprising 7, 5 and 9 as one half portion, and 6, 8 and 10 as the second half portion, are placed upon each other and connected with each other along the rim of rings 9 and 10. This process step is, preferably, carried in an atmosphere of an inert or neutral gas, such as nitrogen or argon and ensures that the semiconductor component is surrounded by such an atmosphere within the housing. During the welding process, the area of parts 9 and 10, adjacent to the ceramic portions 5 and 6 may be cooled, for example, by metal bodies or fins 11.

Obviously many modifications and variations of the present invention are possible in the light of the above teachings. It is therefore to be understood that within the scope of the appended claims, the invention may be practiced otherwise than as specifically described.

We claim:

1. A method for producing a soldered joint between an aluminum oxide hollow body with a central opening and a metal sheet of a Group I*b* metal of the Periodic Table, which comprises the following steps:

providing a Group I*b* metal sheet of not over 0.5 mm. thick and an aluminum oxide hollow body with a central opening which is at least ten times thicker, in the area to be soldered parallel to the metal sheet, than the metal sheet, covering the opening and front face of said aluminum oxide body with said metal sheet, soldering said metal sheet and said aluminum oxide body with a solder selected from the group consisting of silver-copper eutectic solder and gold-copper eutectic solder, and cooling the soldered joint at an average temperature gradient of less than 10° C. per minute.

2. A method as claimed in claim 1 in which the soldered joint is cooled at an average temperature gradient of about 5° C. per minute.

References Cited

UNITED STATES PATENTS

| | | | |
|---|---|---|---|
| 2,728,425 | 12/1955 | Day | 29—473.1 X |
| 3,063,144 | 11/1962 | Palmour | 29—473.1 |
| 3,171,519 | 3/1965 | Nolte | 29—473.1 X |
| 3,280,389 | 10/1966 | Martin | 317—234 |
| 3,302,961 | 2/1967 | Franklin | 29—473.1 X |

FOREIGN PATENTS

| | | |
|---|---|---|
| 466,049 | 5/1937 | Great Britain. |

JOHN F. CAMPBELL, *Primary Examiner.*

R. F. DROPKIN, *Assistant Examiner.*

U.S. Cl. X.R.

29—487, 500, 504, 195; 287—189.365